Figure 1:
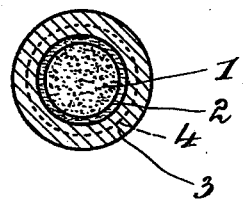

Feb. 12, 1929.　　　　　　　　　　　　　　　1,702,206
J. FRITZSCHE
SAFETY FUSE AND METHOD OF MANUFACTURING THE SAME
Filed Nov. 8, 1926

INVENTOR
JOHANNES FRITZSCHE
BY HIS ATTORNEYS
Howson and Howson

Patented Feb. 12, 1929.

1,702,206

UNITED STATES PATENT OFFICE.

JOHANNES FRITZSCHE, OF WIENER-NEUSTADT, AUSTRIA.

SAFETY FUSE AND METHOD OF MANUFACTURING THE SAME.

Application filed November 8, 1926, Serial No. 147,133, and in Germany February 5, 1925.

My invention relates to safety fuses, more particularly for blasting purposes, of that class in which a core made up of a composition which burns without the access of external air, such as a composition similar to gun powder which burns at a comparatively low speed, hereinafter referred to as the core, is provided with a covering comprising a plurality of substantially concentric layers of yarn or wire and sometimes also of paper.

Whatever may be the conditions in which such safety fuses have to be used they must possess the following properties in the highest possible degree: They must have mechanical strength. They must resist abrasion. They must be impervious to water and moisture. Their core must burn with a uniform speed. The gases evolved in the burning of the core must be able to escape from any point of the fuse a short time after the core has burnt at this point. They must prevent any escape of sparks or flames to the outside.

It has already been proposed to make safety fuses impervious to water and moisture by coating them with gutta percha or rubber, but such fuses lack certain of the necessary properties above referred to. An attempt to remove the deficiencies of such rubber coated safety fuses by vulcanizing the rubber after its application to the fuse cannot be expected to prove successful for the reason that the core of the fuse would be detrimentally affected by high temperatures and chemicals used in vulcanizing.

The object of my invention is to provide a safety fuse possessing the above properties to a satisfactory extent. A further object of my invention is to provide a safety fuse possessing some of the above properties, that may be required by the special conditions of use, to a greater extent than the others. A still further object of my invention is to provide a process of manufacturing my improved safety fuses cheaply, simply and readily.

With these objects in view my invention consists in applying to the covering of the safety fuse a plastic material containing vulcanized rubber with or without the addition of same inert material and in then causing such plastic material to set.

I may prepare the plastic material by softening, swelling or partly dissolving the vulcanized rubber by means of heat and pressure or if desired with the assistance of suitable solvents or swelling agents for vulcanized rubber.

In preparing the plastic mass I may treat the whole quantity of vulcanized rubber to be used therein at the same time whereby I obtain a practically homogeneous mass, or I may add parts of the vulcanized rubber at intervals, or I may treat different sorts of vulcanized rubber thoroughly mixed with each other at the same time, or I may add different sorts of vulcanized rubber in succession and at intervals whereby I attain an inhomogeneous mass which is highly desirable. Under certain conditions I may apply all of the plastic mass desired at the same time, whereby I obtain a single coating having the same characteristics throughout, or I may apply the plastic mass or even different plastic masses at intervals, whereby I obtain a coating comprising a plurality of layers differing in character if desired.

Figure 2:
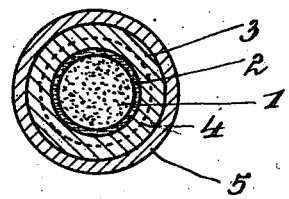
Figure 3:
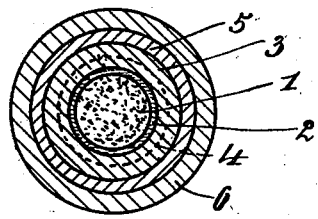

In the annexed drawing Fig. 1 is a transverse section of a safety fuse embodying my invention. Figs. 2 and 3 are similar views of modifications thereof.

1 is the core consisting of any suitable or preferred sort of a composition burning without the access of air. This core is surrounded for example by a suitable paper, wrapper or sheath 2. On the latter one or more layers of yarn or wire substantially concentric to the core 1 are wound as indicated at 3, as is usual in safety fuses. The layers 2 and 3 or a plurality of such layers alternating with each other constitute the covering.

Now according to my invention I apply to the covering a plastic material containing vulcanized rubber at least partly in a plastic state. This mass penetrates into the interstices between the filaments to a certain depth indicated by the circle 4.

The plastic mass containing vulcanized rubber, at least partly in a plastic state, may be obtained by kneading or rolling vulcanized rubber, preferably suitably comminuted at a temperature exceeding 100° centigrade and depending in general on the sort of vulcanized rubber used. I may dissolve or swell vulcanized rubber in suitable solvents such as benzene. Alternatively I may knead or roll vulcanized rubber in the heat with substances such as rosin which readily mix or combine with vulcanized rubber in the heat to form a plastic mass. In the course of preparing the plastic mass I may add thereto indifferent or filler substances such as hair, finely subdivided clay, chalk or sawdust or the like.

In preparing the plastic mass I may treat the entire bulk of vulcanized rubber of one sort only at a time and then I obtain a practically homogeneous mass as regards the rubber. I prefer, however, to mix a plurality of sorts of vulcanized rubber differing in grade of vulcanization whereby I obtain an inhomogeneous plastic rubber mass consisting of a plastic base mass in which are practically uniformly distributed rubber particles in a harder condition that is to say not yet thoroughly plastic but only superficially or partly plastic swelled or dissolved. I also may obtain such an inhomogeneous plastic mass of rubber by adding comminuted vulcanized rubber in the course of preparing the plastic mass in portions successively whereby the particles of the portions added at the beginning are rendered more thoroughly plastic while the particles of the portions added later on are left in a harder condition that is to say only partly or superficially plastic, swelled or dissolved. I wish it, however, to be understood that the preparation of the plastic mass containing vulcanized rubber in at least partly plastic state does not form part of the present invention and that I have explained the above methods only for illustrating how the plastic mass required for the purposes of my invention may be obtained.

After having applied to the covering the said plastic mass containing vulcanized rubber in at least partly plastic condition, whereby such plastic mass has penetrated to the depth indicated by the circle 4 into the covering, I may apply a further coherent coating 5 of the same plastic mass or, if desired, of another sort of the said plastic mass say of a sort which contains a larger percentage of particles of vulcanized rubber in a harder condition as shown in Fig. 2.

After the said plastic mass or masses have been applied to the covering, the plastic mass is allowed to set either by cooling or by evaporating the solvent used in the preparation of the mass or in any other suitable way.

After the plastic mass has set I mount on the safety fuse an outer layer or covering say a layer 6, Fig. 3 of a filament covering which may then be painted, varnished, metallized or otherwise treated as may be desired. Or if I prefer not to mount an outer covering 6 on the plastic mass applied to the inner covering 3, I may paint, varnish, metallize, or otherwise finish the outer surface of the safety fuse formed by the said plastic mass. I wish it to be understood, however, that the painting, varnishing, metallizing and other finishing operations do not form part of my invention, and that I have mentioned here only for the sake of completeness of the description.

The vulcanized rubber to be used in preparing the aforesaid plastic mass is preferably waste vulcanized rubber suitably comminuted and purified if desired. In practice I have found that the rubber from old pneumatic tires, inner tubes as well as coverings, rubber shavings and similar waste vulcanized rubber are especially suitable for the purposes of my invention.

The plastic mass containing vulcanized rubber at least partly in a plastic condition behaves, after setting, nearly similarly to vulcanized rubber. It has the necessary mechanical strength when bare and resists abrasion to a high extent, more particularly if the outer portions of the coating formed of the plastic mass are comparatively rich in particles in a harder condition as above described. The flexibility of the safety fuse is not impaired by the coating. This coating is perfectly impervious to water and moisture and its application to the covering does not at all interfere with the uniform burning of the core. This coating while resisting owing to its mechanical strength the normal pressure of the gases evolved by the burning of the core, yields owing to its elasticity to any accidental excess of the pressure of the gases without bursting and breaking. The gases evolved by the burning of the core can freely escape through the inner space of the safety fuse from any point a short time after the core has burnt at this pont.

The coating of vulcanized rubber prevents any escape of sparks or flames from the burning core to the outside, as has been shown by long and extensive experiments.

As the core burns in my improved safety fuse the progress of the burning is made perceptible only by slight local expansions of the fuse and local lateral escape of small quantities of smoke.

The plastic mass above described may be applied to the covering in any suitable or preferred manner such as squirting, rolling, or the like.

What I claim is:

1. As a new article of manufacture a safety fuse comprising a core adapted to burn without the access of external air, a covering therefor, and at least one coating of a set mass adhering to the covering and comprising a substantially homogeneous base mass and particles of vulcanized rubber at least superficially swelled.

2. As a new article of manufacture a safety fuse comprising a core adapted to burn without the access of external air, a covering therefor and at least one coating of a set mass comprising a substantially homogeneous base mass and particles of vulcanized rubber at least superficially swelled and a coherent coating containing at leat superficially swelled particles of vulcanized rubber in a greater percentage than the first coating and surrounding the said first coating.

3. As a new article of manufacture a safety fuse comprising a core adapted to burn without the access of external air, a covering therefor and at least one coating of a set mass comprising a substantially homogeneous base mass and particles of vulcanized rubber at least superficially swelled and a coherent coating containing at least superficially swelled vulcanized rubber and surrounding the first named coating and a covering mounted on the second named coating.

4. A safety fuse comprising a core adapted to burn without the access of external air, and a covering therefor, in combination with a plastic material containing vulcanized rubber caused to set upon said covering.

5. A safety fuse comprising a core adapted to burn without the access of external air, and a covering therefor, in combination with a plastic material containing vulcanized rubber and an inert material caused to set upon said covering.

6. A safety fuse comprising a core adapted to burn without the access of external air, and a covering therefor comprising filament windings having interstices therebetween, in combination with a plastic material containing vulcanized rubber caused to penetrate into the interstices between the filaments and to set, substantially as described.

In testimony whereof I affixed my signature.

JOHANNES FRITZSCHE.